United States Patent [19]

Parker et al.

[11] 4,428,471
[45] Jan. 31, 1984

[54] CLUTCH OPERATOR WITH A HYDRAULIC ACTUATOR

[75] Inventors: Donald L. Parker, Middletown; Edward H. Warwick, Englewood, both of Ohio

[73] Assignee: General Motors Corporation, Detroit, Mich.

[21] Appl. No.: 362,403

[22] Filed: Mar. 26, 1982

[51] Int. Cl.³ .................... F16D 25/08; F16D 13/44
[52] U.S. Cl. ................... 192/85 C; 192/91 R; 192/99 S
[58] Field of Search .............. 192/91 R, 99 S, 91 A, 192/85 C; 188/170

[56] References Cited

U.S. PATENT DOCUMENTS

| | | | |
|---|---|---|---|
| 1,283,097 | 10/1918 | Daniel | 192/91 R X |
| 2,229,055 | 1/1941 | Dick | 192/91 R X |
| 2,317,135 | 4/1943 | Crittenden et al. | 192/85 C X |
| 2,525,220 | 10/1950 | Hague | 192/91 R |
| 2,883,866 | 4/1959 | Harkleroad | 192/91 R X |
| 3,333,665 | 8/1967 | Einchcomb et al. | 192/99 S |
| 3,433,340 | 3/1969 | Murakami | 192/91 R |
| 3,863,744 | 2/1975 | Bridwell et al. | 192/99 S X |

FOREIGN PATENT DOCUMENTS

| | | | |
|---|---|---|---|
| 547465 | 8/1942 | United Kingdom | 192/91 R |
| 1291103 | 9/1972 | United Kingdom | 192/91 A |

*Primary Examiner*—Rodney H. Bonck
*Attorney, Agent, or Firm*—Donald F. Scherer

[57] ABSTRACT

A clutch operating structure has a hydraulic actuator and a lever which are disposed within the clutch housing. The actuator includes a piston which is slidably disposed in a housing secured within the clutch housing by a fastener. The piston operates on the lever which is pivotally mounted at one end by the securing fastener, while the other end of the lever operates the clutch throwout bearing. Engagement and disengagement of the clutch is controlled by the vehicle operator through a pedal actuated hydraulic device which pressurizes the piston nearing clutch disengagement.

1 Claim, 2 Drawing Figures

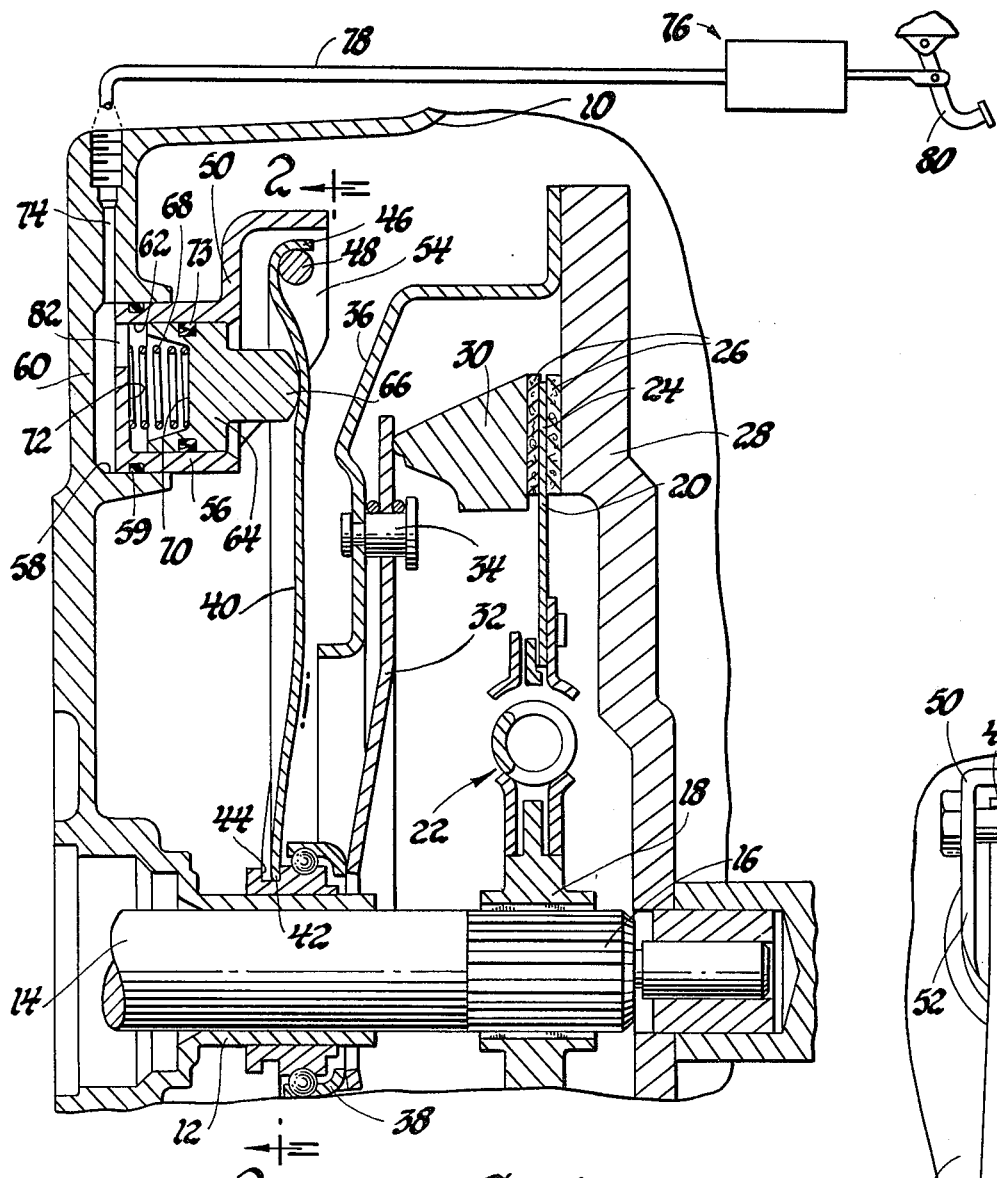
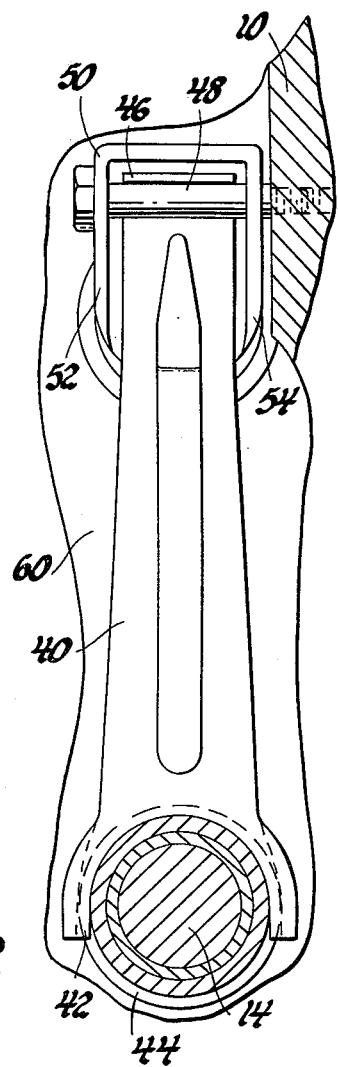
Fig.1
Fig.2

CLUTCH OPERATOR WITH A HYDRAULIC ACTUATOR

This invention relates to clutch operating structures and more particularly to clutch operating structures incorporating a hydraulically actuated lever mechanism.

It is an object of this invention to provide an improved hydraulic clutch operating structure wherein the hydraulic actuating piston and operating lever are encompassed wholly within the clutch housing.

It is another object of this invention to provide an improved clutch operating structure which is mounted wholly within the clutch housing and includes a hydraulically actuated piston slidably disposed in a cylinder and pivot support housing which is secured within the clutch housing by a single fastening member which also provides the pivot point for one end of the clutch operating member which responds to the hydraulic piston for controlled engagement and disengagement of a friction clutch.

These and other objects and advantages of the present invention will be more apparent from the following description and drawing in which:

FIG. 1 is a cross-sectional elevational view of a portion of a friction clutch and the operating structure therefor; and FIG. 2 is a view taken along line 2—2 of FIG. 1.

Referring to the drawings, wherein like characters represent the same or corresponding parts throughout the several views, there is seen a clutch 10, having a centrally disposed hub portion 12 in which is rotatably disposed a shaft 14. The shaft 14 has a splined end portion 16 which is drivingly connected to a clutch hub 18. The clutch hub 18 is connected to a conventional clutch plate 20 through a conventional damper assembly generally designated 22.

The clutch plate 20 has a steel plate 24 which has bonded to each side thereof annular friction discs 26 which are disposed to frictionally engage an engine flywheel 28 and a clutch pressure plate 30, respectively. The clutch pressure plate 30 is urged toward the flywheel 28 by a conventional diaphragm spring 32 which is fulcrumed at pin 34 in a conventional manner. The pin 34 is one of a plurality of such pin members which are secured in a pressure plate housing 36 which in turn is secured to the flywheel 28.

The inner surface of spring 32 is disposed in abutting relationship with a conventional clutch throwout bearing 38 which is slidably disposed on the hub 12. In the position shown, the diaphragm 32 is operable to maintain the clutch plate 20 engaged with the engine flywheel 28 such that rotation of the engine flywheel 28 will result in rotation of the shaft 14.

If the throwout bearing 38 is moved to the right, as viewed in FIG. 1, the outer surface of diaphragm spring 32 will move to the left, thus relieving the engaging pressure such that the clutch plate 20 will be disengaged from the flywheel 28. This is a well-known clutch engaging and disengaging operation.

The throwout bearing 38 is controlled in its movement along hub 12 by a lever 40 which, as seen in FIG. 2, has a yoke 42 at one end thereof which engages in an annular recess 44 formed in the throwout bearing 38. The other end 46 of lever 40 is formed in a hook shape as seen in FIG. 1, and is disposed in abutting relationship with a fastener 48 which is secured in the clutch housing 10 as seen in FIG. 2.

The fastener 48 also passes through a cylinder and support housing 50 which is formed to have a pair of parallel spaced walls 52 and 54 disposed on either side of end 46 of lever 40 and a cylindrical portion 56 which is disposed within a cavity or recess 58. The cavity 58 is formed integrally with an end wall 60 of the clutch housing 10. The outer surface of portion 56 has a groove in which is disposed an annular seal 59.

The cylinder portion 56 has an interior cylindrical wall 62 in which is slidably disposed a piston 64 having a protuberance 66 disposed in abutting relationship with lever 40 intermediate the yoke 42 and end 46. The piston 64 is urged into abutment with the lever 40 by a compression spring 68 disposed between surface 70 on piston 64 and end wall 72 of the cylinder and support housing 50. The piston 64 is cylindrical in shape and has an annular seal 73 which seals against wall 62.

The recess 58 is connected to a hydraulic passage 74 which in turn is connected to a conventional foot operated hydraulic pressure actuator 76 through a passage 78. The hydraulic pressure actuator 76 includes a clutch pedal 80 which is controlled by the vehicle operator when clutch disengagement is desired. Depression of the clutch pedal 80 results in pressure generation in the cavity 58, which pressure is transmitted to the surface 70 of piston 64 through an opening 82 formed in end wall 72. The seals 59 and 73 prevent hydraulic fluid leakage into the clutch housing 10. The piston 64 acting on lever 40 causes rightward movement of the throwout bearing 38 when the pressure in cavity 58 is sufficient to create a piston output force which will overcome the force found in diaphragm spring 32. The hydraulic pressure, and therefore the piston force, necessary for clutch disengagement is determined in part by the ratio of the overall length of lever 40 to the distance between piston 64 and the yoke 42 of lever 40. Since the overall length of lever 40 can be controlled by the position of fastener 48, the necessary hydraulic pressure for clutch disengagement can be somewhat controlled in the initial design by the distance between the center of fastener 48 and the location at which piston 64 abuts the lever 40.

Therefore, various clutch disengaging forces can be utilized for various transmission structures by simply changing the housing 50 such that the distance between fastener 48 and piston 64 is selectively chosen to provide the desired clutch disengagement force. It will be noted from the description and drawing that a very compact and simple clutch operating structure is provided by the present invention. It is also obvious from the foregoing description that there are no external operating parts of the clutch which can be damaged by the external hazards and also that the clutch engagement mechanism is maintained in proper adjustment by the spring 68 which maintains the piston 64 in abutment with lever 40 and therefore the throwout bearing 38 in abutment with the inner surface of diaphragm spring 32.

The embodiments of the invention in which an exclusive property or privilege is claimed are defined as follows:

1. A clutch operating structure for a selectively operable friction clutch which is rotatably mounted wholly within a clutch housing, said structure comprising; a cavity formed in the clutch housing; a cylinder and pivot support housing supported in said cavity and including a hydraulic cylinder portion and a lever support portion; means securing said cylinder and pivot support housing to said clutch housing and being positioned for providing a pivot surface; a clutch operating lever having one end pivotally disposed on said pivot surface and the other end operatively connected with said friction clutch; piston means slidably disposed in said cylinder portion; spring means disposed in said cylinder portion for maintaining said piston means in abutting relation with said clutch operating lever intermediate the ends thereof; and fluid passage means in communication with said cylinder portion for conducting pressurized fluid thereto for actuating said piston means to cause pivoting of said clutch operating lever for selectively operating said friction clutch.

* * * * *